United States Patent
Minko et al.

(10) Patent No.: US 10,310,491 B2
(45) Date of Patent: Jun. 4, 2019

(54) RADIATING ELEMENT AND ENGINEERED MAGNETIC MATERIAL

(71) Applicant: The United States of America, as represented by the Secretary of the Army, Washington, DC (US)

(72) Inventors: Glenn Minko, Staten Island, NY (US); Johnny Lee Daniel, Aberdeen, MD (US); Katherine Duncan, Newark, DE (US); James Breakall, Port Matilda, PA (US); Mahmoud Khalil, Lincroft, NJ (US); Mohamed Khalil, Lincroft, NJ (US)

(73) Assignee: The United States of America, as represented by the Secretary of the Army, Washington, DC (US)

( * ) Notice: Subject to any disclaimer, the term of this patent is extended or adjusted under 35 U.S.C. 154(b) by 1183 days.

(21) Appl. No.: 14/150,165

(22) Filed: Jan. 8, 2014

(65) Prior Publication Data

US 2015/0194726 A1     Jul. 9, 2015

Related U.S. Application Data

(60) Provisional application No. 61/924,407, filed on Jan. 7, 2014.

(51) Int. Cl.
*H01Q 1/00* (2006.01)
*G05B 19/418* (2006.01)
*H01Q 15/00* (2006.01)

(52) U.S. Cl.
CPC ..... *G05B 19/41865* (2013.01); *H01Q 15/004* (2013.01)

(58) Field of Classification Search
CPC .... G05B 19/41865; G05B 2219/31386; H01Q 1/36; H01Q 9/16; H01Q 7/06; H01Q 9/065; H01Q 15/004
(Continued)

(56) References Cited

U.S. PATENT DOCUMENTS 4,414,550 A * 11/1983 Tresselt ............... H01Q 9/0407
                                                  342/373
4,429,314 A * 1/1984 Albright ............... H01Q 19/09
                                                  343/788

(Continued)

OTHER PUBLICATIONS

Laure Huitema et al., Frequency Tunable Antenna Using a Magneto-Dielectric Material for DVB-H Application, IEEE Transactions on Antennas and Propagation, vol. 61, No. 9, Sep. 2013, pp. 4456 to 4466.*

*Primary Examiner* — Dieu Hien T Duong
(74) *Attorney, Agent, or Firm* — Ronald Krosky; Azza Jayaprakash

(57) ABSTRACT

Various embodiments are described that relate to a radiating element and an engineered magnetic material. In a communication environment a radiating element can be used to communicate information, such as to send signals. Various factors, including electromagnetic factors, can influence the performance of the radiating element. In one example, if the radiating element becomes too close to a ground plane, then performance of the radiating element can suffer. To counter negative effects of being too close to the ground plane an engineered magnetic material can be employed that causes the radiating element to perform better when relatively close to the ground plane.

19 Claims, 9 Drawing Sheets

(58) Field of Classification Search
USPC .................................................. 343/787, 788
See application file for complete search history.

(56) References Cited

U.S. PATENT DOCUMENTS

| | | | | |
|---|---|---|---|---|
| 5,563,616 | A * | 10/1996 | Dempsey | H01Q 1/38 343/700 MS |
| 6,677,901 | B1 * | 1/2004 | Nalbandian | H01Q 9/0442 343/700 MS |
| 6,873,305 | B2 * | 3/2005 | Rawnick | H01Q 15/148 343/781 CA |
| 6,894,652 | B2 * | 5/2005 | Rawnick | H01Q 3/44 343/753 |
| 7,482,977 | B2 | 1/2009 | Kuroda et al. | |
| 7,821,468 | B2 * | 10/2010 | Aoyama | H01Q 1/243 343/700 MS |
| 8,524,190 | B2 | 9/2013 | Hill | |
| 8,588,848 | B2 | 11/2013 | Kuang | |
| 2007/0080866 | A1 * | 4/2007 | Hayakawa | H01Q 3/44 343/700 MS |
| 2007/0273600 | A1 * | 11/2007 | Tsujimura | H01Q 1/2225 343/787 |
| 2009/0046028 | A1 | 2/2009 | Han et al. | |
| 2009/0295662 | A1 * | 12/2009 | Suetsuna | H01Q 1/48 343/787 |
| 2010/0066624 | A1 * | 3/2010 | Masuda | H01Q 9/27 343/787 |
| 2010/0156732 | A1 * | 6/2010 | Ito | H01Q 1/52 343/787 |
| 2011/0050518 | A1 * | 3/2011 | Oki | H01Q 1/1214 343/713 |
| 2013/0234899 | A1 | 9/2013 | Pope et al. | |
| 2013/0307544 | A1 | 11/2013 | Cole et al. | |
| 2013/0307748 | A1 | 11/2013 | Martek et al. | |

* cited by examiner

RADIATING ELEMENT AND ENGINEERED MAGNETIC MATERIAL

CROSS-REFERENCE

This application claims priority to U.S. Provisional Patent Application No. 61/924,407 that was filed on Jan. 7, 2014, the entirety of which is hereby incorporated by reference.

GOVERNMENT INTEREST

The innovation described herein may be manufactured, used, imported, sold, and licensed by or for the Government of the United States of America without the payment of any royalty thereon or therefor.

BACKGROUND

In wireless communications a radiating element can be used to communicate a signal from a source to a destination. Various interferences can occur that cause distortion of the signal, cause the signal to not be successfully communicated to the destination, and the like. If the signal is not properly communicated to the destination, then valuable information may not be received by a party that would greatly benefit from such information. Example consequences can include a telephone call being lost, a decision being made with incomplete information, etc.

SUMMARY

In one embodiment, a system comprises a radiating element. The system also comprises an engineered magnetic material. Presence of the engineered magnetic material can cause a power of an emission from the radiating element to be greater than a power of the emission from the radiating element with omission of the engineered magnetic material.

In one embodiment, a system comprises a dipole radiation element, an engineered magnetic material, and a metallic ground plane. The dipole radiation element can radiate a signal with a power. The engineered magnetic material can cause the power radiated to be greater than the power radiated would be in absence of the engineered magnetic material, where a first side of the engineered magnetic material faces the dipole radiation element. The metallic ground plane can face a second side of the engineered magnetic material that is opposite to the first side of the engineered magnetic material, where the power radiated from the dipole radiation element is radiated away from the metallic ground plane.

In one embodiment, a system comprises a processor and a non-transitory computer-readable medium. The non-transitory computer-readable medium can be communicatively coupled to the processor that stores a command set executable by the processor to facilitate operation of components. The components can comprise a determination component configured to make a determination of a size property set of a Ferrite material. The components can also comprise a construction component configured to cause production of the Ferrite material in accordance with the size property set, where the Ferrite material is integrated with a dipole radiating element such that the dipole radiating element integrated with the Ferrite material causes a power of an emission from the dipole radiating element to be greater than a power of the emission from the radiating element without the Ferrite material.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Figure 1:
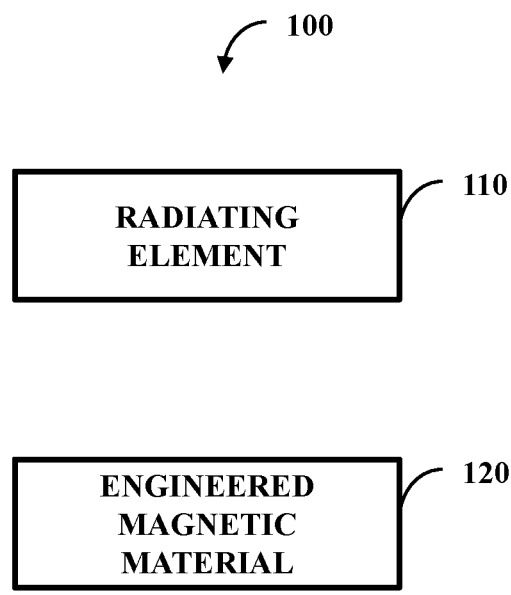
FIG. 1 illustrates one embodiment of a system comprising a radiating element and an engineered magnetic material.

In a communication environment a radiating element can be used to communicate information, such as to send signals. Various factors, including electromagnetic factors, can influence the performance of the radiating element. In one example, if the radiating element becomes too close to a ground plane, then performance of the radiating element can suffer. To counter negative effects of being too close to the ground plane an engineered magnetic material can be employed that causes the radiating element to perform better when relatively close to the ground plane.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

FIG. 1 illustrates one embodiment of a system 100 comprising a radiating element 110 and an engineered magnetic material 120. In one embodiment, the radiating element 110 is a dipole radiating element, a patch radiating element, monopole radiating element, or other planar radiating element. The presence of the engineered magnetic material 120 can cause a power of an emission from the radiating element 110 to be greater than a power of the emission from the radiating element 110 with omission of the engineered magnetic material 120. This can be the case, in one embodiment, when a condition is met (e.g., that the system 100 is a certain distance from a ground plane).

The engineered magnetic material 120 can have properties similar to a Ferrite material, such as an isotropic or anisotropic Ferrite material. Also, the engineered magnetic material 120 can have a relative magnetic permeability (designated as $\mu_r$) as well as a relative electric permittivity (designated as $\epsilon_r$). The value of the relative magnetic permeability can be interrelated with the relative electric permittivity. Further, the relative magnetic permeability can be about equal to the relative electric permittivity. In one embodiment, the relative electric permittivity is greater than the relative magnetic permeability. The relative electric permittivity and/or the relative magnetic permeability can be greater than about 1. In one embodiment, the relative magnetic permeability has a value of 5 or greater. The relative electric permittivity and the relative magnetic permeability can have loss tangents. In one example, the loss tangent for the relative magnetic permeability at 400 MHz (MegaHertz) can be equal to about 0.14 and the loss tangent for the relative electric permittivity at 400 MHz can be equal to about 0.025.

In one embodiment, the radiating element 110 can be mounted directly onto the engineered magnetic material 120. A combination of the radiating element 110 and the engineered magnetic material 120 can be an antenna. However, to optimize the performance characteristics (e.g., gain and Voltage Standing Wave Ratio) of the antenna for a desired frequency band, the antenna design can include a gap between the radiating element 110 and the engineered magnetic material 120. The size of this gap can be determined using an optimizing function of electromagnetic software. If the optimization results show that a gap between the radiating element 110 and the engineered magnetic material 120 would increase antenna performance, then the antenna can be configured with a gap (e.g., air gap, gap filled with a foam substance or other substance that functions as a spacing material). In one example, the optimal distance of the radiating element 110 through the engineered magnetic material 120 can be approximately 0.2 of wavelength (e.g., the engineered magnetic material can be adjacent to a ground plane).

In one embodiment, the radiating element 110 can be fabricated on a low loss tangent dielectric substrate (e.g., a circuit board), of about 0.125 mm to about 2 mm in thickness. This dielectric can then be mounted on the engineered magnetic material 120. In one embodiment, the system 100 functions as a receiving and/or a transmitting antenna that communicates with an antenna (e.g., receiving and/or transmitting antenna) with its own radiating element and engineered magnetic material.

Figure 2:
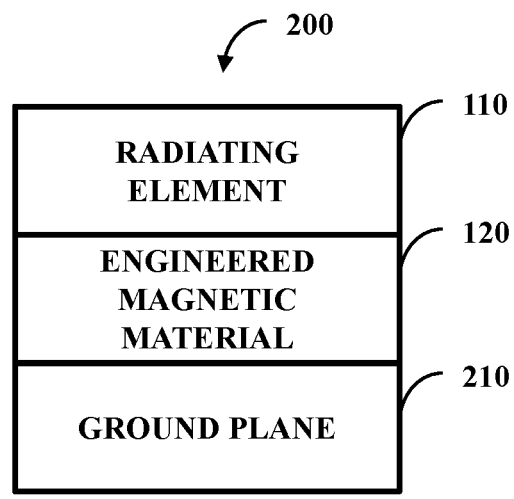
FIG. 2 illustrates one embodiment of a system comprising the radiating element, the engineered magnetic material, and a ground plane.

FIG. 2 illustrates one embodiment of a system 200 comprising the radiating element 110, the engineered magnetic material 120, and a ground plane 210. In one example, the radiating element 110 can be mounted on a side of a vehicle and be used for communication. The side of the vehicle can be equivalent to the ground plane 210 to the radiating element 110. It may be desirable to place the radiating element 110 relatively close to the vehicle side for reasons such as the vehicle being sleeker and keeping a smaller profile. However, as the radiating element 110 is placed closer to the side of the vehicle the radiating element can suffer from undesirable effects from the side of the vehicle without the appropriate inclusion of engineered magnetic material as described herein.

In one embodiment, a dipole antenna can be mounted in an omni-directional configuration on the topside of a vehicle. In this configuration, the dipole antenna can radiate to a horizon with a radiation pattern encompassing 360 degrees. However, the dipole antenna gain may be limited and there may be the negative effects of Electromagnetic Interference (EMI) with other antennas which are mounted on the vehicle topside. In one embodiment, a sectoral or hemispherical antenna (or group of antennas) can be mounted on the side of the vehicle with the side functioning as the ground plane 210. These antennas could radiate away from the vehicle, have higher gain, and there would not exist the negative EMI effects regarding other antennas mounted on the vehicle topside. To implement this type of antenna, in one embodiment, the radiating element 110 can be backed by the ground plane 210 which can be the side of the vehicle. However, if the radiating element 110 is too close to ground plane 210, then the ground plane 210 can cause the signal to bounce back and interfere destructively with the radiating element 110. With the radiating element 110 being too close to the ground plane 210, the radiating element 110 (and in turn the signal it radiates) can lose bandwidth and/or radiation. The inclusion of the engineered magnetic material 120, such as a Ferrite slab, can greatly improve the antenna performance (e.g., improved gain and Voltage Standing Wave Ratio (VSWR)) as compared with the omission of the Ferrite engineered magnetic material 120. A distance can be selected for the radiating element 110 that lowers the losses with respect to bandwidth and/or radiation. This distance (e.g., wavelength-based distance) can be calculated by the speed of light divided by the frequency of the signal that the radiating element radiates.

In one embodiment, the engineered magnetic material 120 can be configured in a shape to cause the radiating element 110 to not lose bandwidth and not lose radiation resistance causing mismatch loss as the radiating element 110 approaches the ground plane 210 of the radiating element 110 at a distance that surpasses a distance that would cause unsubstantial loss of bandwidth that is computed through use of a frequency of the signal emitted by the radiating element and the speed of light. Thus, the engineered magnetic material 120 can provide for the radiating element 110 increased performance, such as allowing the radiating element 110 to continue operation without loss of bandwidth and/or radiation resistance achieving low mismatch loss, while the radiating element 110 becomes closer to ground plane 210. In one embodiment, a length and/or a width of the engineered magnetic material extends beyond a footprint of the radiating element on the ground plane.

Figure 3:
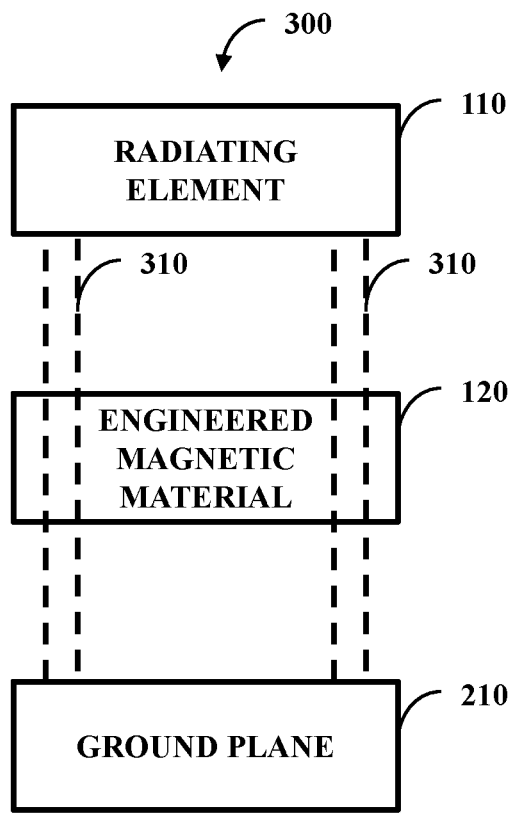
FIG. 3 illustrates one embodiment of a system comprising the radiating element, the engineered magnetic material, the ground plane, and a pair of anchors.

FIG. 3 illustrates one embodiment of a system 300 comprising the radiating element 110, the engineered magnetic material 120, the ground plane 210, and a pair of anchors 310. The radiating element 110, engineered magnetic material 120, and ground plane 210 can be physically connected together by one or more anchors 310. In one embodiment, the anchors 310 are configured such that a coaxial cable or other cable is provided through the ground plane 210 and through the engineered magnetic material 120 by way of the anchors 310 and into the radiating element 110. Connection to the radiating element 110 can include a balun to provide a desired impedance transformation and a balanced current feed. The anchors 310 can function to keep various parts in their proper place, such as the radiating element 110, and can provide an assembly that is electrically and mechanically robust.

In one embodiment, the radiating element 110 is fed through the engineered magnetic material 120. While the anchors 310 can be physical anchors, the anchors 310 can be open spaces, or a single anchor 310 can be a single open space, from which to feed the radiating element 110. Thus an anchor 310 can be a space that facilitates anchoring the radiating element 110 to a radio or other device. This space can allow access for feeding the radiating element 110 with Radio Frequency (RF) power from an RF generator (e.g., a generator that is part of the system 300 or separate from the system 300). This RF power can be transmitted from the generator to the radiating element through a cable that runs through the anchor 310. One of ordinary skill in the art will appreciate that the radiating element 110 can be fed from a location that does not pass through the engineered magnetic material 120, such as from a side of the radiating element 110.

In one embodiment, the engineered magnetic material 120 is configured in a shape such that causes a radiation gain pattern from the radiating element 110 to be optimized over a desired frequency range. Optimization can be performed through use of electromagnetic computational software. Electromagnetic computational software can also be used to determine an optimal distance of the radiating element 110 from the engineered magnetic material 120.

Figure 4:
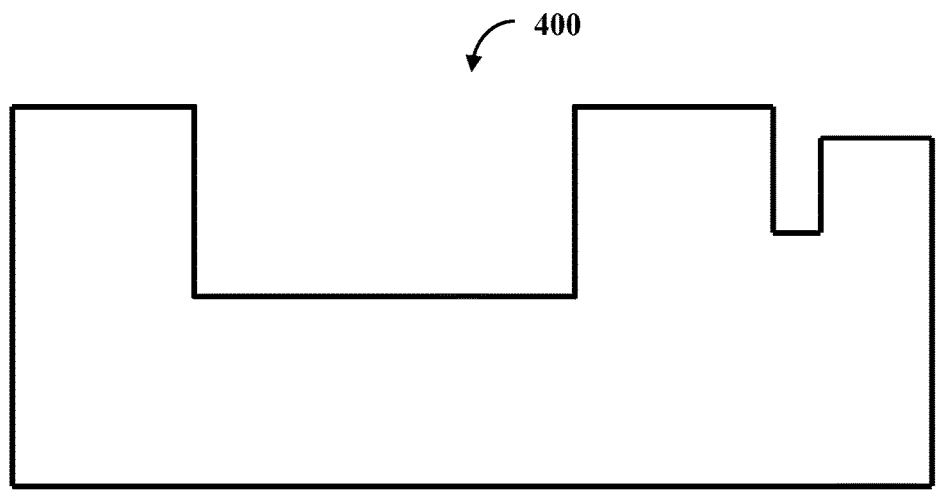
FIG. 4 illustrates one embodiment of a cross-section of the engineered magnetic material.

FIG. 4 illustrates one embodiment of a cross-section 400 of the engineered magnetic material 120 illustrated in FIGS. 1-3. Different configurations of the engineered magnetic material 120 can be used in order to achieve different results. In one embodiment, the engineered magnetic material 120 of FIGS. 1-3 can be a flat slab. In one embodiment, the engineered magnetic material 120 of FIGS. 1-3 is of a non-uniform height on its side that faces the radiating element 110 of FIGS. 1-3.

Different shape characteristics of the engineered magnetic material 120 can cause different performance of the radiating element 110 and in turn different characteristics of a signal that the radiating element 110 is communicating (e.g., a more powerful signal, a more clear signal etc.). While the cross-section 400 of the engineered magnetic material 120 illustrated in FIGS. 1-3 is illustrated along one axis, it is to be appreciated by one of ordinary skill in the art that the face of the engineered magnetic material 120 can vary along peaks and valleys (e.g., one or more peak, one or more valley, one or more peak with one or more valley). In one embodiment, electromagnetic software can be used to determine the thickness and/or the topography of the engineered magnetic material 120.

Figure 5:
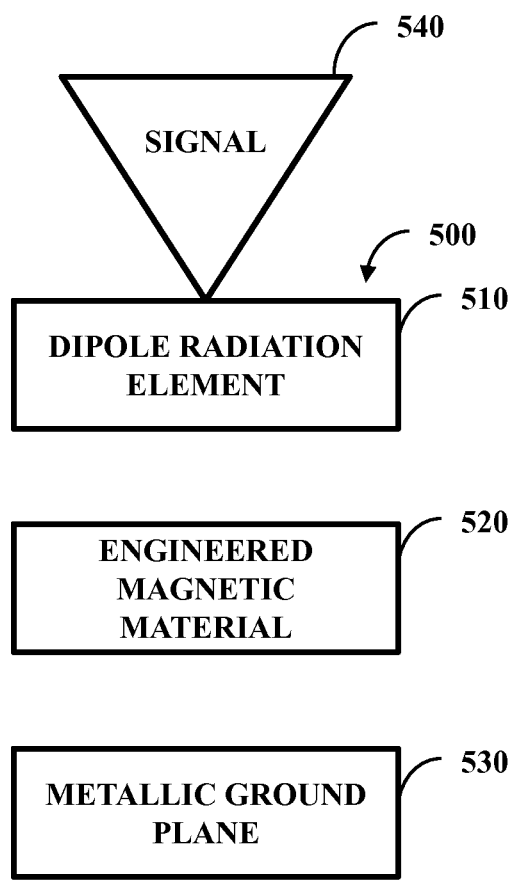
FIG. 5 illustrates one embodiment of a system comprising a dipole radiation element, an engineered magnetic material, and a metallic ground plane.

FIG. 5 illustrates one embodiment of a system 500 comprising a dipole radiation element 510, an engineered magnetic material 520, and a metallic ground plane 530. The dipole radiation element 510 (e.g., actual dipole radiation element or radiation element with dipole-like characteristics) can be configured to radiate a signal 540 with a power. The engineered magnetic material 520 can cause the power radiated to be greater than the power radiated would be in absence of the engineered magnetic material 520. This can be accomplished by the engineered magnetic material 520 causing a better bandwidth for the system 500. The power radiated from the dipole radiation element 510 can be radiated away from the metallic ground plane 530. The engineered magnetic material 520 can have two (or more) sides—a first side that faces the dipole radiation element 510 and a second side (e.g., on a plane parallel to the first side) opposite the first side that faces the metallic ground plane 530. The metallic ground plane 530 can provide structural support for the dipole radiation element and the engineered magnetic material 520.

In one embodiment, the metallic ground plane 530 is attached to and/or part of a radio and the dipole radiation element 510 is connected to the radio by way of a cable. The dipole radiation element 510 can radiate in a boresight direction that is a direction of maximum gain for the signal 540. The metallic ground plane 530 can be configured to reflect RF power for the signal to the boresight direction and this can cause reduced performance of the system 500 absent the engineered magnetic material 520. The engineered magnetic material 520 can be configured to cause a much more favorable phasing of the signal off of the metallic ground plane 530 with respect to the dipole radiation element 510 through use of near field electromagnetic field quantities. The engineered magnetic material 520 can separate the dipole radiation element 510 from the metallic ground plane 530. Inclusion of the engineered magnetic material 520 can result in a sharp reduction of VSWR. This reduction of VSWR indicates that less power is reflected from the system 500 and back to the radio, where the radio can become damaged. This results in greater power being transmitted from the dipole radiation element 510 and in turn a more effective and more desirable RF transmission. In addition, due to antenna reciprocity, the system 500 can have improved performance characteristics when used to receive RF signal.

Figure 6:
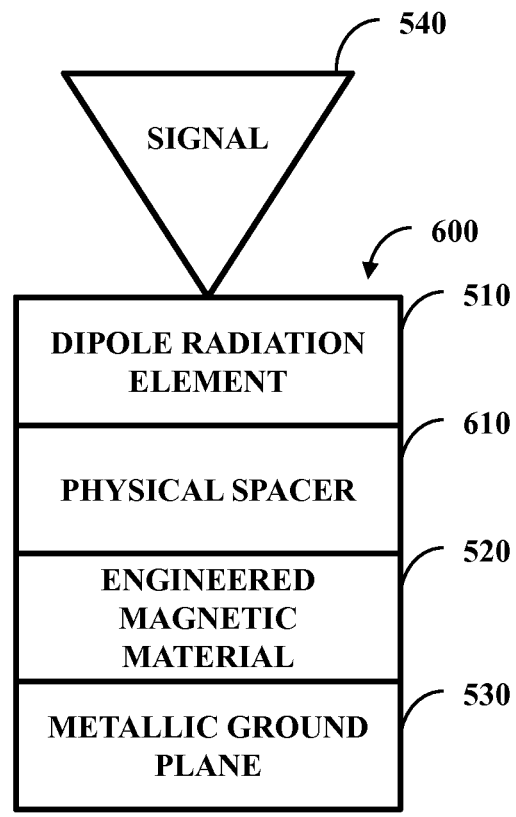
FIG. 6 illustrates one embodiment of a system comprising the dipole radiation element, a physical spacer, the engineered magnetic material, and the metallic ground plane.

FIG. 6 illustrates one embodiment of a system 600 comprising the dipole radiation element 510, a physical spacer 610, the engineered magnetic material 520, and the metallic ground plane 530. The physical spacer 610 (e.g., a foam spacer) can be positioned between the dipole radiation element 510 and the engineered magnetic material 520. This physical spacer 610 can keep the dipole radiation element 510 at a relatively fixed and specific distance from the engineered magnetic material 520. In one embodiment, the electrical permittivity and magnetic permeability of the physical spacer 610 are similar to that of air. If the physical spacer 610 is not used, then in one embodiment the dipole radiation element 510 and the engineered magnetic material 520 can be separated by air. The radiation element 510, physical spacer 610, engineered magnetic material 520, the metallic ground plane 530, or a combination thereof may have no physical separation or have a physical separation between any two that face one another.

In one embodiment, the dipole radiation element 510 can physically touch the physical spacer on a first side of the physical spacer 610. Similarly, the engineered magnetic material 520 can physically touch the physical spacer 610 on a second side of the physical spacer 610 that is opposite the first side of the physical spacer 610. Thus, the physical spacer 610 can be configured such that the dipole radiation element 510 and the engineered magnetic material 520 do not physically touch.

In one embodiment, the dipole radiation element 510 is about two or more times closer to the metallic ground plane 530 than a distance that would cause unsubstantial loss of bandwidth that is computed through use of a frequency of the signal and the speed of light. In one embodiment, the engineered magnetic material 520 is of a substantially uniform thickness along an axis that faces dipole radiation element 510. In one example, the engineered magnetic material 520 can be a flat surface on the side that faces the dipole radiation element 510. The dipole radiation element 510, the engineered magnetic material 520, the metallic ground plane 530, and the physical spacer 610 can be substantially parallel to one another and occupy different planes.

Figure 7:
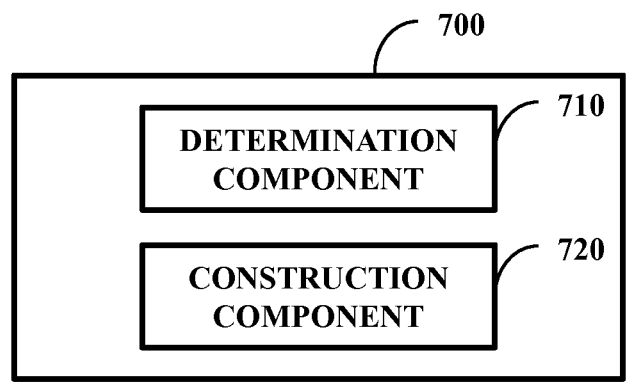
FIG. 7 illustrates one embodiment of a system comprising a determination component and a construction component.

FIG. 7 illustrates one embodiment of a system 700 comprising a determination component 710 and a construction component 720. The determination component 710 can be configured to make a determination of a size property set (e.g., one or more size property) of a Ferrite material (e.g., an actual Ferrite material or a material with Ferrite-like properties). In one embodiment, the size property set (e.g., height, width, thickness, topography, etc.) of the Ferrite material is based, at least in part, on a matched radiation resistance for a dipole radiating element. The distance of the dipole radiating element from a ground plane can be known to the system 700 and the size property set can be based, at least in part, on having a certain result for communication of a signal from the dipole radiating element when at this known distance. Thus, the size property set can be determined (e.g., selected) based on a desired result with the known distance.

In one embodiment, determination component 710 can cause the minimum thickness of the Ferrite material to be 0.01 of the wavelength which corresponds to the lowest frequency of the band (e.g., anticipated frequency band for which the Ferrite material will be used). Likewise, the determination component can use maximum thickness of the Ferrite material to be about 0.2 of the wavelength which corresponds to the highest frequency of the band. The radiating element can be about 0.2 wavelength from the ground plane, this wavelength corresponds to the highest frequency of the band.

In one embodiment, the determination component 710 can use an electromagnetic computer program to determine an optimal thickness of the Ferrite material and/or a distance between the radiating element and the Ferrite material. The Ferrite material can fill an entire space between the ground plane and the radiating elements. However a configuration can also be used such that a smaller amount of Ferrite material can be used in the antenna so the entire space is not filled. A relatively thin layer of the Ferrite material can be laid on the ground plane with foam placed between the Ferrite material and the radiating element (e.g., the physical spacer 610 of FIG. 6). The purpose of the foam can be to maintain a certain distance between the radiating element and the Ferrite material.

The length and width of the Ferrite material can be extended beyond a footprint of the radiating element on the ground plane. The exact length and width can be determined on size requirements of the antenna and result from using the optimizing function of electromagnetic software.

In one embodiment, the size property set comprises a z-axis thickness of the Ferrite material (e.g., depth), an x-axis length of the Ferrite material (e.g., length), a y-axis length of the Ferrite material (e.g., width). The Ferrite material can have uniform thickness or have a varied thickness to different degrees (e.g., sloped, multiple peaks and valleys, plateaus, etc.).

The construction component 720 can be configured to cause production of the Ferrite material (or other engineered magnetic material) in accordance with the size property set. In one embodiment, the Ferrite material is a low-loss Ferrite material near to an electrical conductor (e.g., copper ground plane or aluminum ground plane) where radiation resistance and bandwidth increase as the dipole radiating element approaches the ground plane. An integration component (e.g., that can be part of the system 700) can be configured to cause integration of the Ferrite material with the dipole radiating element. This integration can occur such that the dipole radiating element integrated with the Ferrite material causes a power of an emission from the dipole radiating element to be greater than a power of the emission from the radiating element without the Ferrite material.

The construction component 720 can receive parameters that the construction component 720 uses in construction of the Ferrite material. In one example, input (e.g., user-supplied input, computer-supplied input, etc.) can be obtained by the determination component 710. This input can include that the Ferrite material is to be x length away from the ground plane and/or the radiating element. Based, at least in part, on this length number the determination component 710 can determine what properties the Ferrite material should have and communicate these properties to the construction component. Example properties can include size properties such as height, length, depth, or topography of shape facing the dipole radiating element (e.g., flat, peaks and valleys, etc.) as well as form properties and/or other properties (e.g., type of Ferrite material to use). Form properties can be the chemical make-up of the Ferrite material, how the Ferrite material should be made, density of the Ferrite material, etc.

The construction component 720 can construct the Ferrite material in accordance with the properties determined by the determination component 710. In one embodiment, the construction component 720 takes a substantial block of Ferrite material and cuts the Ferrite material into a shape and with other characteristics in light of the properties determined by the determination component 710. In one embodiment, the construction component 720 creates the Ferrite material from a base material set. The construction component 720 can output the Ferrite material (e.g., anisotropic Ferrite material) and an integration component or a laborer can produce an antenna with the dipole radiating element and the Ferrite material. The integration component or the laborer can integrate the antenna with the ground plane.

In one embodiment, the size property set comprises a z-axis thickness of the Ferrite material (e.g., depth), an x-axis length of the Ferrite material (e.g., length), a y-axis length of the Ferrite material (e.g., width). The Ferrite material can have uniform thickness or have a varied thickness to different degrees (e.g., sloped, multiple peaks and valleys, plateaus, etc.).

In one embodiment, an antenna can be formed by way of integration of the Ferrite material and the dipole radiating element. The antenna can be integrated (e.g., physically constructed and operatively connected) into a communication device (e.g., a radio) by connecting the communication device to the dipole radiating element using a cable or other transmission line. This connection can include the use of a balun between the radio and the dipole radiating element for the purposes of matching impedances and providing a balanced feed to the dipole radiating element. This electrical connection can pass through the ground plane without making an electrical connection with the ground plane. This would enable the communication device to use the dipole radiating element to send a signal. The integration of the antenna can occur in a manner that the dipole radiating element, that does not directly contact the ground plane, is separated from the ground plane by at least the Ferrite material. This integration can occur such that the dipole radiating element is about two or more times closer to the metallic ground plane than a distance that would cause unsubstantial loss of bandwidth that is computed through use of a frequency of the signal and the speed of light. In one embodiment, the determination made by the determination component 710 is based, at least in part, on creation of a relatively low physical profile of the dipole radiating element in comparison to the ground plane.

Figure 8:
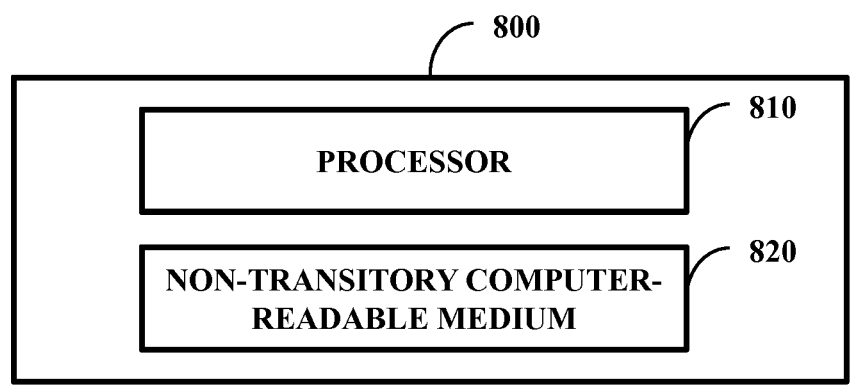
FIG. 8 illustrates one embodiment of a system comprising a processor and a non-transitory computer-readable medium.

FIG. 8 illustrates one embodiment of a system 800 comprising a processor 810 and a non-transitory computer-readable medium 820. In one embodiment the non-transitory computer-readable medium 820 is communicatively coupled to the processor 810 and stores a command set executable by the processor 810 to facilitate operation of at least one component disclosed herein (e.g., the determination component 710 and/or the construction component 720 of FIG. 7). In one embodiment, at least one component disclosed herein (e.g., the determination component 710 and/or the construction component 720 of FIG. 7) can be implemented, at least in part, by way of non-software, such as implemented as hardware by way of the system 800. In one embodiment, the non-transitory computer-readable medium 820 is configured to store processor-executable instructions that when executed by the processor 810, cause the processor 810 to perform a method disclosed herein (e.g., the method 900 discussed below).

Figure 9:
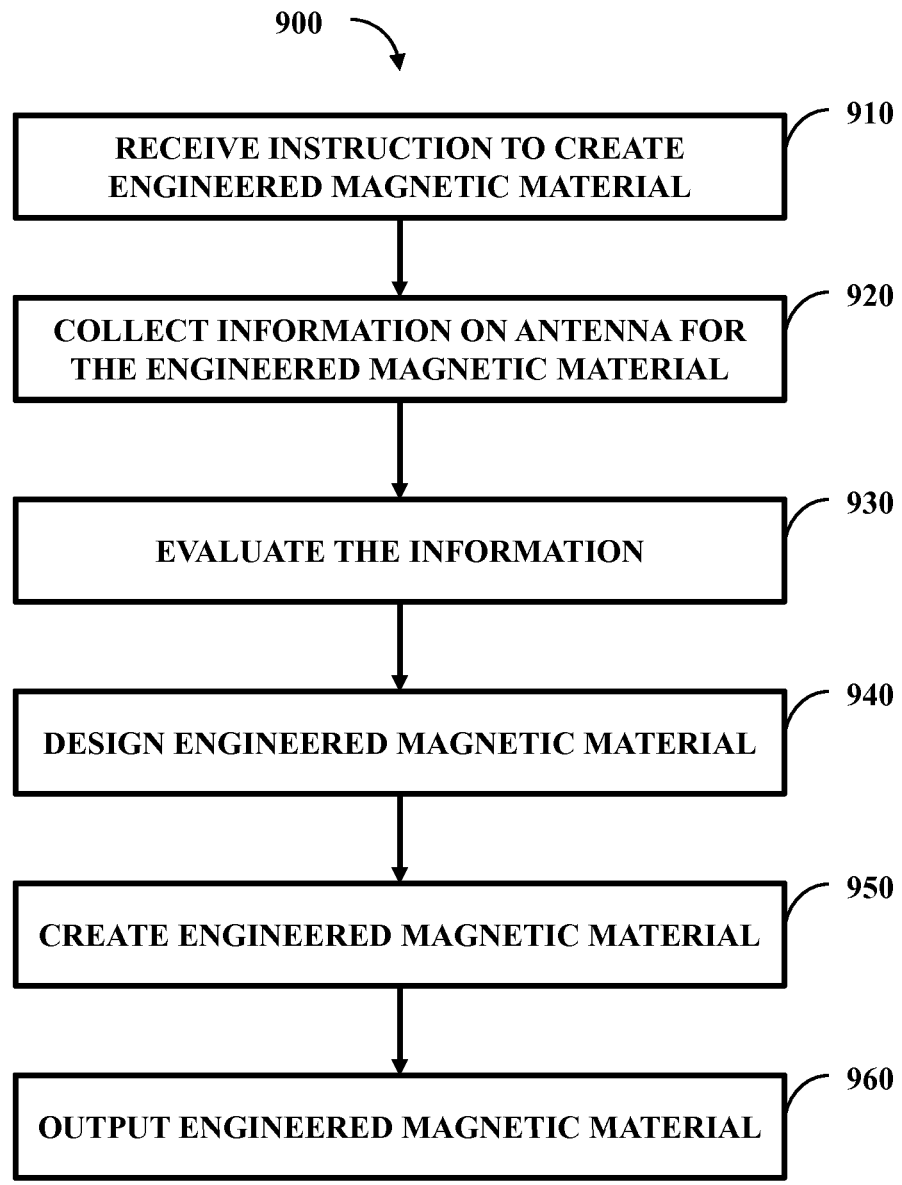
FIG. 9 illustrates one embodiment of a method comprising six actions.

FIG. 9 illustrates one embodiment of a method 900 comprising six actions 910-960. The method 900 can be a method for producing an engineered magnetic material (e.g., a method performed by the construction component 720). At 910 an instruction to create the engineered magnetic material can be received. This instruction can be human-generated, generated proactively by a machine when a certain state is reached, etc. The instruction can be processed (e.g., analyzed to determine content of the instruction) and this processing can lead to information collection. Information on an antenna that will use the engineered magnetic material can be collected at 920. This information can include how the antenna may be used, anticipated distance of a radiating element of the antenna from a ground plane, etc. The information can be evaluated at 930 and based on this evaluation, the engineered magnetic material can be designed at 940. Once designed, the engineered magnetic material can be created at 950 and outputted at 960. After being outputted, the engineered magnetic material can be integrated into the antenna.

An antenna that includes an engineered magnetic material (e.g., the system 100 of FIG. 1) can have greater performance characteristics than a conformal antenna without the engineered magnetic material. In one example, the antenna that includes the engineered magnetic material can have a greater gain, a smaller visual signature (e.g., by way of the radiating element being closer to the ground plane) and lower VSWR (Voltage Standing Wave Ratio).

Many antennas can have a relatively high VSWR, but use of the antenna that includes the engineered magnetic material can result in a relatively low VSWR. The VSWR can be a figure of merit which defines how much power is reflected back to a transmitter from an antenna. If the VSWR is high, a generator may automatically turn off or reduce the power being sent to the antenna. The generator may be designed to do this in order to protect itself from the reflected power. In the case of the CIED (Counter Improvised Explosive Device) mission, the generator shutting off or reducing power may leave troops more vulnerable to IEDs In the case of a general communications, the antenna that includes the engineered magnetic material can enable a greater range (distance) since greater power is being radiated.

An advantage of the antenna that includes the engineered magnetic material is that it can be directional. The gain pattern of the antenna that includes the engineered magnetic material (e.g., a gain pattern of the radiating element 110 of FIG. 1) can be hemispherical (e.g., substantially hemispherical) and therefore a substantial amount of the power is directed away from the ground plane (e.g., vehicle, base, etc.). In one embodiment, the overall gain can be greater for the antenna that includes the engineered magnetic material than the gain for an antenna absent the engineered magnetic material. This greater gain can result in more effective communications.

The antenna that includes the engineered magnetic material can be used for EW (Electronic Warfare) as well as general voice and/or data communications. In an EW example, the antenna that includes an engineered magnetic material can be used for the CIED (Counter Improvised Explosive Device) missions. Use in CIED missions can entail jamming RF (Radio Frequency) signals being sent from insurgents trying to detonate IEDs (Improvised Explosive Devices). In one embodiment, the antenna that includes the engineered magnetic material can be mounted on the side of a vehicle. Multiple antennas can be mounted on the vehicle. In one example, one antenna can be mounted on each side of the vehicle. The RF power from the individual antennas could be directed away from the vehicle and toward threats.

In a general communication example, superior performance characteristics of the antenna that includes an engineered magnetic material can enable better communications. Example communications can include satellite, cellular, and WiFi. In one example, the antenna that includes the engineered magnetic material could be pointed so that a boresight direction or other aiming point is pointing in the direction desired for making contact with a desired party. Multiple antennas could also be used, using a configuration such as one antenna on each side of a building for better communication.

What is claimed is:

1. A system, comprising:
a radiating element configured to operate within a frequency band with a high frequency and a low frequency; and
an engineered magnetic material with a thickness within a thickness range of a maximum thickness and a minimum thickness,
where the minimum thickness is equal to about 0.01 of a wavelength that corresponds to the low frequency for the frequency band,
where the maximum thickness is equal to about 0.2 of a wavelength that corresponds to the high frequency for the frequency band,
where the thickness of the engineered magnetic material is of a non-uniform thickness.

2. The system of claim 1,
where the engineered magnetic material is configured to be coupled to a ground plane,
where the engineered magnetic material is physically between the ground plane and the radiating element, and
where the engineered magnetic material causes the radiating element to radiate in a direction substantially away from the ground plane.

3. The system of claim 1, where the radiating element is a dipole radiating element.

4. The system of claim 1, where the engineered magnetic material is an isotropic Ferrite material.

5. The system of claim 1,
where the thickness of the engineered magnetic material is of an about uniform thickness.

6. The system of claim 1,
where the high frequency is a highest frequency of the frequency band and
where the low frequency is a lowest frequency of the frequency band.

7. A system, comprising:
a radiating element configured to radiate a signal with a power; and
an isotropic Ferrite material,
where the radiating element comprises a first portion and a second portion that is opposite the first portion,
where the Ferrite material is positioned to face the first portion and not the second portion, and
where the Ferrite material mitigates propagation of the signal in a direction away from a first portion.

8. The system of claim 7, where:
the radiating element has two longer sides opposite one another and two shorter sides opposite one another,
the first portion is along one of the two longer sides, and
the second portion is along one of the two longer sides.

9. The system of claim 8, where:
the radiating element is parallel to the isotropic Ferrite material and
a gain pattern of an emission of the radiating element is substantially hemispherical due to the isotropic Ferrite material.

10. The system of claim 7,
where the radiating element is configured to operate in a frequency band,
where the frequency band comprises an upper frequency limit associated with a lower wavelength and a lower frequency limit associated with an upper wavelength,
where the isotropic Ferrite material has a thickness,
where the thickness is greater than or equal to about 1% of the upper wavelength, and
where the thickness is no greater than or equal to about 20% of the lower wavelength.

11. The system of claim 10,
where the isotropic Ferrite material has a relative magnetic permeability,
where the isotropic Ferrite material has a relative electric permittivity, and
where the relative magnetic permeability is about equal to the relative electric permittivity.

12. The system of claim 10,
where the isotropic Ferrite material has a relative magnetic permeability,
where the isotropic Ferrite material has a relative electric permittivity, and
where the relative magnetic permeability is about less than the relative electric permittivity.

13. The system of claim 7,
where the thickness of the engineered magnetic material is of a non-uniform thickness,
where the thickness is within the maximum thickness and the minimum thickness,
where the minimum thickness is equal to about 1% of a wavelength that corresponds to the lowest frequency for the frequency band, and
where the maximum thickness is equal to about 20% of a wavelength that corresponds to the highest frequency for the frequency band.

14. A system, comprising:
a radiating element configured to radiate a signal; and
an engineered magnetic material positioned on one side of the radiating element such that the signal contacts the engineered magnetic material,
where the engineered magnetic material has a relative magnetic permeability,
where the engineered magnetic material has a relative electric permittivity,
where the relative magnetic permeability is about equal to or less than the relative electric permittivity,
where the radiating element is a dipole radiating element, and
where the engineered magnetic material is an isotropic Ferrite material.

15. The system of claim 14,
where the relative magnetic permeability is greater than a value of about 5.

16. The system of claim 14, where:
the radiating element is parallel to the engineered magnetic material and
a gain pattern of the signal is substantially hemispherical and directional.

17. The system of claim 14,
where the relative magnetic permeability is about equal to the relative electric permittivity.

18. The system of claim 14,
where the relative magnetic permeability is less than the relative electric permittivity.

19. The system of claim 14,
where the radiating element comprises a first portion and a second portion that is opposite the first portion,
where the isotropic Ferrite material is positioned to face the first portion and not the second portion,
where the isotropic Ferrite material mitigates propagation of the signal in a direction away from a first portion,
where the radiating element has two longer sides opposite one another and two shorter sides opposite one another,
where the first portion is along one of the two longer sides, and where the second portion is along one of the two longer sides.

\* \* \* \* \*